US009436688B2

(12) United States Patent
Gilra et al.

(10) Patent No.: US 9,436,688 B2
(45) Date of Patent: Sep. 6, 2016

(54) DURATIONAL REFERENCING CUE POINTS FOR LINKING MULTIMEDIA FILES

(75) Inventors: Anant Gilra, Bangalore (IN); Ashish Duggal, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 477 days.

(21) Appl. No.: 12/128,375

(22) Filed: May 28, 2008

(65) Prior Publication Data

US 2014/0032548 A1    Jan. 30, 2014

(51) Int. Cl.
*G06F 17/00* (2006.01)
*G06F 17/30* (2006.01)

(52) U.S. Cl.
CPC ............... *G06F 17/30038* (2013.01)

(58) Field of Classification Search
CPC ............ G06F 17/30864; G06F 17/30867; G06F 17/3053; G06F 17/3064; G06F 17/30595
USPC ................................. 707/726, 706
See application file for complete search history.

(56) References Cited

U.S. PATENT DOCUMENTS

| | | | |
|---|---|---|---|
| 6,289,363 B1* | 9/2001 | Consolatti et al. | 715/255 |
| 2005/0156932 A1* | 7/2005 | Vienneau et al. | 345/473 |
| 2007/0006064 A1* | 1/2007 | Colle et al. | 715/500.1 |
| 2007/0118873 A1* | 5/2007 | Houh et al. | 725/136 |

* cited by examiner

*Primary Examiner* — Truong Vo
(74) *Attorney, Agent, or Firm* — Shook, Hardy & Bacon L.L.P.

(57) ABSTRACT

In some example embodiments, a system and method are illustrated to link a plurality of scenes from at least one multimedia file. The system and method include loading a plurality of multimedia files including a first and second multimedia file. The first multimedia file includes a first scene, and the second multimedia file includes a second scene. The system and method include linking the first scene with the second scene. The linking includes connecting a first durational data for the first scene with a second durational data for the second scene. The first durational data identifies a first start location and a first end location for the first scene. The second durational data identifies a second start location and a second end location for the second scene. The system and method further include generating a linked durational data file as a result of the linking.

28 Claims, 15 Drawing Sheets

```xml
<?XML VERSION="1.0" ENCODING="UTF-8"?>
<FLVCOREDURATIONALCUEPOINTS>
<DURATIONALCUEPOINT>
    <START>1200</START>
    <END>2000</END>
    <TYPE>NAVIGATION</TYPE>
    <GENRE>FANTASY</GENRE>
    <ACTOR>DANIEL RADCLIFFE</ACTOR>
    <TITLE>HARRY POTTER IV</TITLE>
    <RANK>SECOND</RANK>
    <DESCRIPTION>CUEPOINT1_FIGHTING</DESCRIPTION>
</DURATIONALCUEPOINTS>
<DURATIONALCUEPOINT>
    <START>2000</START>
    <END>3500</END>
    <TYPE>NAVIGATION</TYPE>
    <GENRE>FANTASY</GENRE>
    <ACTOR>DANIEL RADCLIFFE</ACTOR>
    <TITLE>HARRY POTTER I</TITLE>
    <RANK>FIRST</RANK>
    <DESCRIPTION>CUEPOINT2_STORYOFPARENTS</DESCRIPTION>
</DURATIONALCUEPOINTS>
<LINKFILES>
    <LOAD>HARRY POTTER IV</LOAD>
    <LOCATE>CUEPOINT1_FIGHTING</LOCATE>
    <LOAD>HARRY POTTER I</LOAD>
    <LOCATE>CUEPOINT2_STORYOFPARENTS</LOCATE>
    <CONNECT>CUEPOINT1_FIGHTING;
        CUEPOINT2_STORYOFPARENTS</CONNECT>
</LINKFILES>
```

*FIG. 10*

DURATIONAL REFERENCING CUE POINTS FOR LINKING MULTIMEDIA FILES

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright © 2008, Adobe Systems Incorporated. All Rights Reserved.

TECHNICAL FIELD

Example embodiments relate generally to the technical field of algorithms and programming and, in an example, to the generation and linking of cue points to edit multimedia files.

BACKGROUND

Video streaming is a form of data streaming that refers to the process of delivering video over a network. A video file is selected from a menu of video files stored on a remote server. The content is delivered to, and viewed through, a media player while a video buffer stores and presents the information; the video file resides on a remote server for viewing although it can be downloaded directly onto the user's computer for viewing. Streaming video is often used to refer to an availability of video-on-demand, but it can also mean a video broadcast in real time as an event unfolds. Video streaming enables the real time or on-demand distribution of audio, video and multimedia over the network including the Internet. Data streaming can be applied to any kind of digital data including multimedia files (e.g., video, song or audio book, etc.) or ordinary data (e.g., text or image, etc.).

BRIEF DESCRIPTION OF THE DRAWINGS

Some embodiments are illustrated by way of example and not limitation in the figures of the accompanying drawings in which:

FIG. 10 is extensible Markup Language (XML) code illustrating a script file in accordance with an example embodiment.

DETAILED DESCRIPTION

Figure 1:
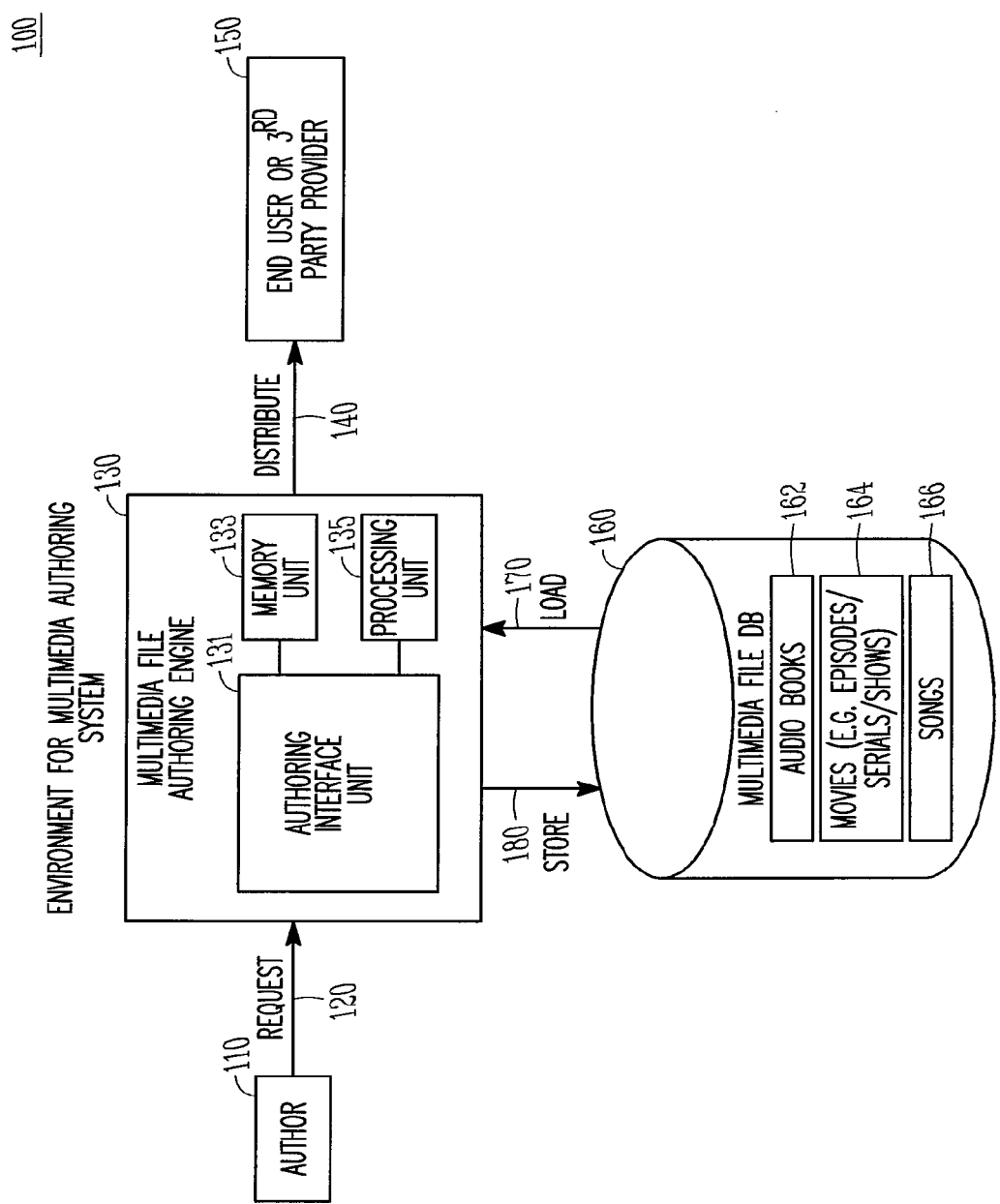
FIG. 1 is a diagram of a multimedia files authoring system, in accordance with an example embodiment.

In some example embodiments, a system and method are illustrated to link a plurality of scenes from at least one multimedia file. The system and method include loading a plurality of multimedia files including a first and second multimedia file. The first multimedia file includes a first scene, and the second multimedia file includes a second scene. The system and method include linking the first scene with the second scene. The linking includes connecting a first durational data for the first scene with a second durational data for the second scene. The first durational data identifies a first start location and a first end location for the first scene. The second durational data identifies a second start location and a second end location for the second scene. The system and method further include generating linked durational data file as a result of the linking.

In some example embodiments, a system and method are illustrated to play a plurality of scenes from at least one multimedia file. The system and method include loading a plurality of multimedia files including a first and second multimedia file. The first multimedia file includes a first scene. The system and method include identifying a trigger to play the first scene. The trigger includes category information associated with the first scene. The system and method include locating a multimedia file (or a plurality of multimedia files) including durational data based upon the category information. The durational data identifies a start location and an end location for a scene. The system and method further include playing the scene identified by the durational data included in the located multimedia file.

A cue point may be used to indicate a point at which a video/audio player dispatches a controlling event while a multimedia file plays. In some example embodiments, the multimedia file may be in a format or codec selected from a group including at least one of a Flash Video (FLV), Moving Picture Expert Group (MPEG), H.120, H.261-H.264, VP6, RealVideo, RealAudio, G.722, G723, G726, G729, etc. Embedded cue points (e.g., navigation cue point and event cue point) may be added to an FLV file at times when the FLV file needs to interact with another element on a web page. External cue points (e.g., ActionScript cue point) are may be used through a separate script file. In some example embodiments, these cue points are just at one position and used for controlling streaming of multimedia files or guiding metadata to that position, etc. In such scenarios, a cue point only has a start time.

Durational data, identifying a reference segment, having a temporal reference value may be used to control a flow of playing multimedia files. In some example embodiments, the durational data identifying the reference segment may be implemented as a durational referencing cue point (hereinafter "durational cue point" is used interchangeably with "durational referencing cue point"). The durational referencing cue point identifies an entire duration of content, not a single content point. That is, the durational referencing cue point may identify both a start location (e.g., point or time) and an end location (e.g., point or time) of a contextually related scene. A temporal reference value of each durational referencing cue point may be different from one another depending on several factors. For example, an independent start location (e.g., time) and end location (e.g., time) may be assigned to each durational referencing cue point identifying a scene in a multimedia file. This way, an editor of the multimedia file may set a variable temporal reference value to the durational referencing cue point. Using these durational referencing cue points allows, for example, creating and playing a summary or prerequisite with a variable length. More detailed information about using the durational data (e.g., durational referencing cue point) is given below using FIGS. 1-12.

FIG. 1 is a diagram of a multimedia files authoring system 100 in accordance with an example embodiment. Illustrated in FIG. 1 are a user (e.g., author) 110, multimedia file authoring engine 130, end users or third-party providers 150 and multimedia file database 160. The user 110 may provide a request 120 to the multimedia file authoring engine 130 to author or edit one or more multimedia files. The multimedia file authoring engine 130 comprises an authoring interface unit 131, memory unit 133 and processing unit 135. Once the request 120 from the author is received via the authoring interface unit 131, one or more requested multimedia files may be loaded from the memory unit 133 for processing by the processing unit 135. In some example embodiments, a separate multimedia file database 160 is, locally or remotely, operatively coupled to the multimedia file authoring engine 130. Operatively coupled may include a logical or physical connection. When the separate multimedia file database 160 is connected, a plurality of multimedia files are stored in the multimedia file database 160 according to several categories, such as audio books 162, movies (e.g., episodes/serials/shows) 164 and songs 166, etc. This categorization for multimedia files may be extended to other ones as necessary. One or more multimedia files are loaded 170 from the multimedia file database 160 to the memory unit 133 as needed to service the request 120 from the user 110. Final or intermediate multimedia files produced by the processing unit 135 may be stored back 180 into the multimedia file database 160 for later use.

When the requested authoring or editing work is done by the processing unit 135, the edited multimedia file is distributed to one or more end users or third-party providers 150. The distribution 140 is done electronically through a suitable network, such as the Internet, Local Area Network (LAN), Wide Area Network (WAN), etc. It is noted, however, that the distribution 140 may be done via a non-network distribution medium, such as Digital Video Disc (DVD) or Compact Disc (CD) containing the edited multimedia file.

Figure 2:
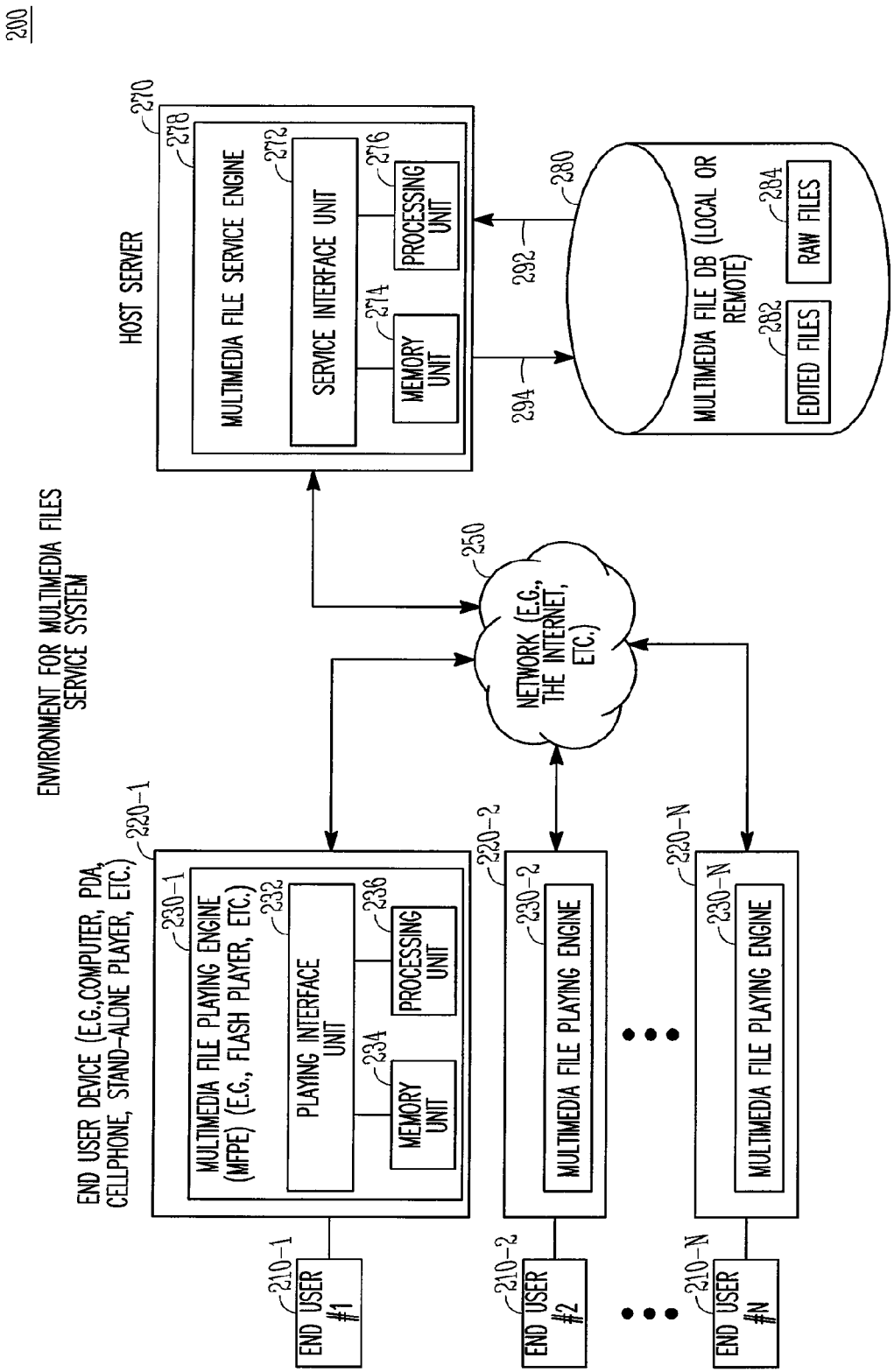
FIG. 2 is a diagram of a multimedia files service system in accordance with an example embodiment.

FIG. 2 is a diagram of a multimedia files service system 200 in accordance with an example embodiment. Illustrated in FIG. 2 are one or more end user devices 220 operatively accessible by corresponding end users 210, network 250, host server 270 including operatively coupled multimedia file database 280. Each of the end users (210-1 through 210-N) access one of corresponding end user devices (220-1 through 220-N) and provides a request to play a multimedia file to the end user device. In some example embodiments, two or more end users commonly share one end user device (not shown in FIG. 2). End user devices 220 may be a personal computer, Personal Digital Assistant (PDA), cell phone, stand-alone player, etc. For example, an end user device 220-1 executes a multimedia file playing engine 230-1 (e.g., ADOBE's FLASH PLAYER, etc.). This multimedia file playing engine 230-1 may be a client-side engine that interacts with a browser application. Likewise, each of the end user devices 220-2 through 220-N has a corresponding multimedia file playing engine 230-2 through 230-N. Although detailed explanation is given below for multimedia file playing engine 230-1 only, other multimedia file playing engines 230-2 through 230-N may have the same functionality. The multimedia file playing engine 230-1 comprises playing interface unit 232, memory unit 234 and processing unit 236. These elements are operatively coupled to one another. When a request to play one or more multimedia files is received from the end user 210-1 via the playing interface unit 232, the processing unit 236 searches the requested multimedia files through the memory unit 234. If the requested multimedia files are found in the memory unit 234, the processing unit 236 plays the multimedia files through the playing interface unit 232. More detailed explanation about playing the requested multimedia files is given below using FIG. 7. If the requested multimedia files are not found in the memory unit 234, the processing unit 236 displays corresponding messages through the playing interface unit 232 and waits for a next request from the end user 210-1. In some example embodiments, for example, a request to download the multimedia files is sent via a network 250 to a host server 270. The network 250 may be any suitable network, such as the Internet, LAN or WAN, etc.

The host server 270 executes a multimedia file service engine 278. The multimedia file service engine 278 comprises service interface unit 272, memory unit 274 and processing unit 276. These elements are operatively coupled to one another. When the end user request is received via the service interface unit 272, the processing unit 276 retrieves and transfers the requested multimedia files from the memory unit 274 to the corresponding end user device 220-1 through the network 250. In some example embodiments, if the requested multimedia files are raw files and have not been edited, the host server 270 edits the multimedia files according to the end user request before transferring the multimedia files to the end user 210-1. In such a scenario, the host server 270 additionally performs the function of the multimedia file authoring engine 130 as described using FIG. 1. In some example embodiments, a separate multimedia file database 280 may be optionally connected to the host server 270, locally or remotely. In such a scenario, raw multimedia files 284 are loaded 292 from the multimedia file database 280 to the multimedia file service engine 278 upon receipt of the request from the end user 210-1. Once the requested raw multimedia files are edited by the processing unit 276, the edited multimedia files 282 are stored back 294 into the multimedia file database 280 for later use. The host server 270 may be a web server, a media server, or some other suitable type of server that facilitates the streaming of content, such as digital content including multimedia files. Further, in some example embodiments, a plurality of media servers may be used. Similarly, in some example embodiments, a plurality of web servers in combination with the plurality of media servers may be used.

Figure 3:
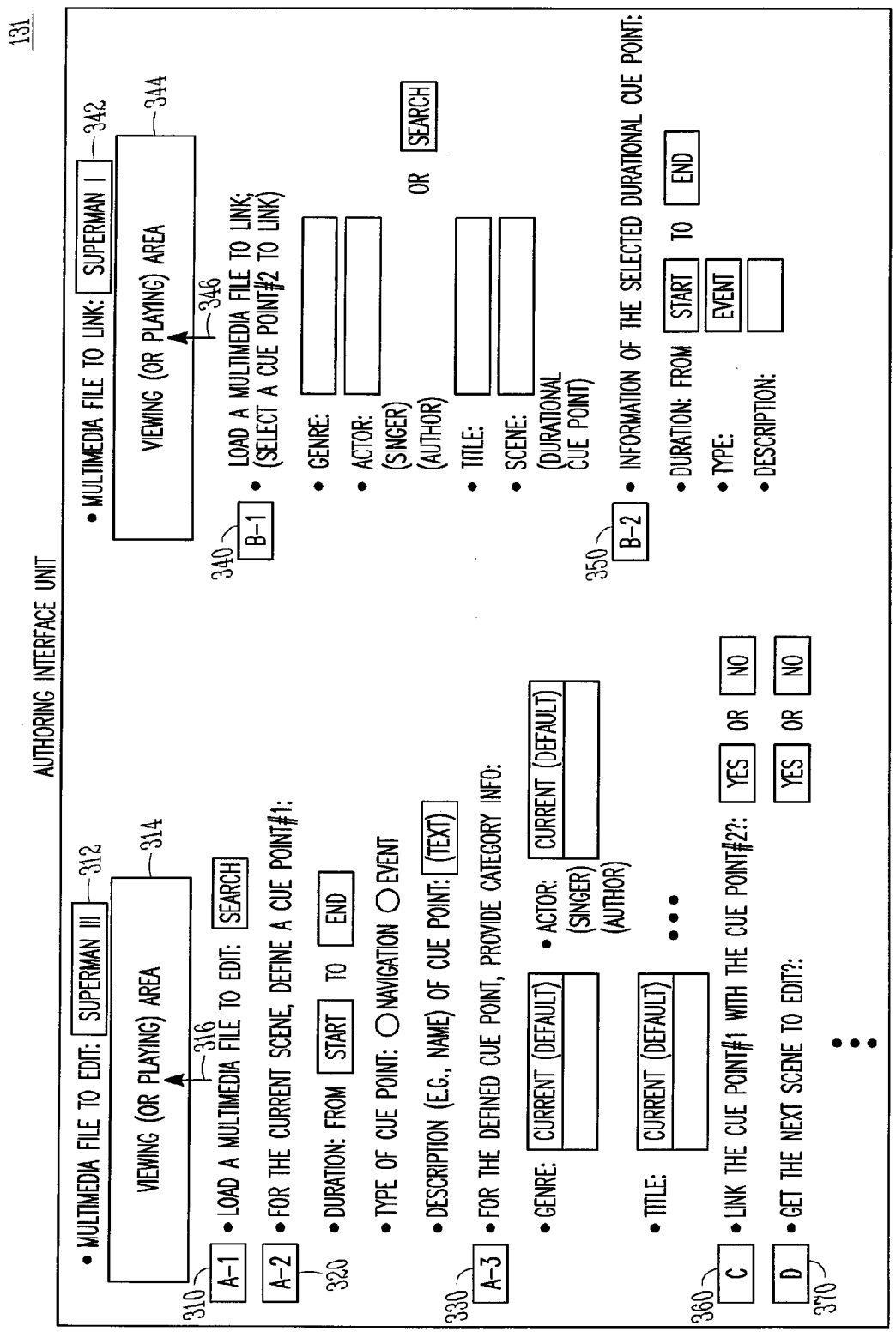
FIG. 3 is an authoring interface unit in accordance with an example embodiment.

FIG. 3 is an authoring interface unit 131 in accordance with an embodiment. This authoring interface unit 131 may be part of a stand-alone application, or a web-based application. Various screen objects or widgets may be used to implement the below referenced functionality. Illustrated in FIG. 3 are an area showing a title of a current multimedia file to edit 312, a viewing area 314 including a scene indicator 316 to display the current multimedia file, a menu to load a multimedia file to edit 310, a menu to define first durational data (e.g., a first durational cue point) for a currently loaded scene 320, a menu to associate category information with the first durational data (e.g., the first durational cue point) 330, an area to show the title of a multimedia file to link 342, viewing area 344 including an scene indicator 346 to display the multimedia file to link, a menu to load the multimedia file to link to select a second durational data (e.g., a second durational cue point) to link 340, a menu to show the information of the second durational data (e.g., the second durational cue point) 350, a menu to link the first durational data (e.g., the first durational cue point) with the second durational data (e.g., the second durational cue point) 360 and a menu to get the next scene to edit 370. In some example embodiments, the authoring interface unit 131 may be used to receive a user request and edit (e.g., to link) one or more multimedia files according to the user request as explained in FIG. 1. In some example embodiments, the authoring interface unit 131 may further function as the service interface unit 272 to transfer a requested multimedia file to end users as explained in FIG. 2. Detailed functions of these menus of the authoring interface unit 131 may be apparent from explanations given below using FIGS. 4-9.

Although FIG. 3 illustrates linking two movies only, in some example embodiments, the linking of durational data (e.g., durational cue points) could be one-many, many-one and many-many too, and across multimedia files. To facilitate the same, whenever durational data (e.g., durational cue point) is added, a list of existing durational data (e.g., durational cue points) in the multimedia file may be displayed. In some example embodiments, the durational data may be displayed optionally with thumbnails, such as frame snapshots/thumbnail videos, etc.). A user then may choose one or more durational data (e.g., durational cue points) to link to the added durational data from here. Additionally, a user may choose multiple multimedia files and that would show all the durational data (e.g., durational cue points) from all the files.

In some example embodiments, the creation, modification and linking may be done on the timeline itself. Selecting a duration and right clicking would bring up a context menu with, for example, "Create Durational Cue Point." Alternately, a button can be used. When pressed, the button would add a durational cue point to the selected portion. The start-end time would get automatically filled. The rest of the metadata can be filled via a dialog. Hovering over an existing cue point would bring up its metadata, which can be modified. The linkages would be shown and can be created as per the comment above. The linkages could also be shown as a graph, and changed via the graph. Modifying may also include splitting up a cue point into multiple cue points. This action copies all the metadata into split cue points and each of the metadata in the split cue points may be modified separately.

Figure 4A:
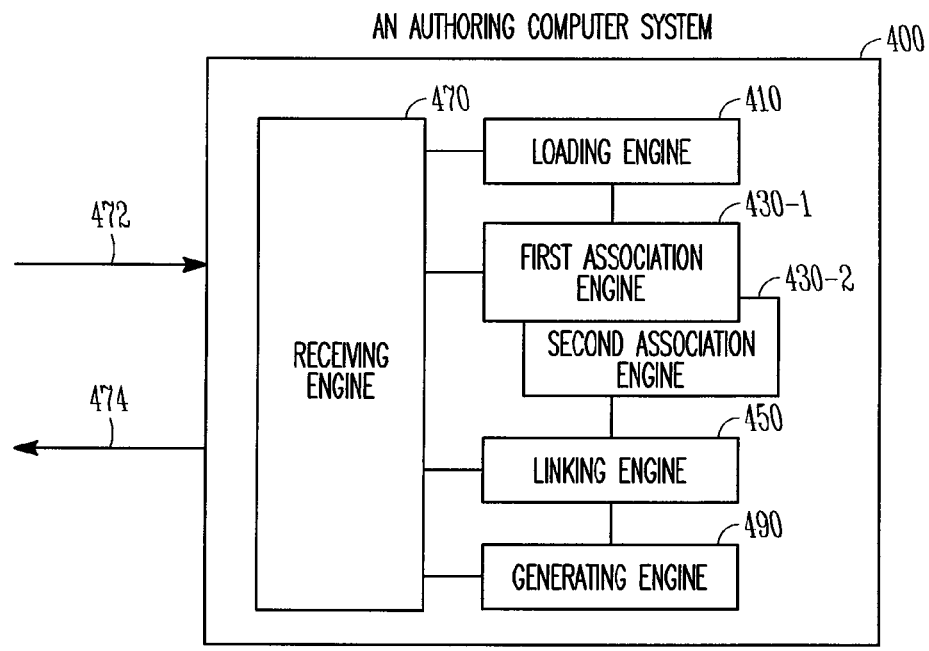
FIG. 4A is a diagram of a computer system for authoring multimedia files in accordance with an example embodiment.

FIG. 4A is a diagram of an authoring computer system 400 in accordance with an example embodiment. The various blocks illustrated herein may be implemented as hardware, firmware, or even as software. The authoring computer system 400 comprises loading engine 410, linking engine 450 and generating engine 490. The loading engine 410 loads a plurality of multimedia files including a first and second multimedia file. The first multimedia file includes a first scene, and the second multimedia file includes a second scene. The linking engine 450 links the first scene with the second scene. In linking the first scene with the second scene, the linking engine 450 links or connects a first durational data (e.g., first durational cue point) for the first scene with a second durational data (e.g., second durational cue point) for the second scene. More detailed illustrative explanation about linking a plurality of scenes is given below using FIG. 9A. The generating engine 490 generates linked durational data file (e.g., a linked durational cue point file) as a result of the linking. The linked durational data file may be a file comprising one or more durational cue points from one or more multimedia files. In some example embodiments, the linked durational data file may be a summary of one or more multimedia files that are related to a currently loaded multimedia file. In some example embodiments, the linked durational data file may be prerequisite scenes or similar scenes from one or more multimedia files. In some example embodiments, the first multimedia file may be the same as the second multimedia file. In such a case, the first scene and the second scene may be included in the same multimedia file. This allows the linked durational data file for the first scene to be a summary or certain scenes of the first multimedia file.

In some example embodiments, the authoring computer system 400 may further have first association engine 430-1 and second generation engine 430-2. The association engine associates a start location (e.g., start time), an end location (e.g., end time) and category information for each of a plurality of scenes with a corresponding durational data (e.g., durational cue point). For example, the first association engine 430-1 associates a first start location, a first end location and category information of the first scene with the first durational cue point. The second association engine 430-2 associates a second start location, a second end location and category information of the second scene with the second durational cue point. In some example embodiments, the first association engine 430-1 and the second association engine 430-2 may be the same entity (not shown in FIG. 4A). In some example, the authoring computer system may have more than two association engines as necessary. More detailed illustrative explanation about associating a start location, an end location and category information with corresponding durational data (e.g., a durational cue point) is given below using FIG. 9B.

In some example embodiments, the linking engine 450 links the first scene with the second scene based upon the category information of the second scene matching the category information of the first scene. For example, prerequisite scenes may be generated by linking durational cue points based on their category information. In some example embodiments, the linking engine 450 connects the first durational data (e.g., the first durational cue point) with the second durational data (e.g., the second durational cue point) bi-directionally. For example, the linking engine 450 may connect the second end location of the second duration cue point to the first start location of the first durational cue point such that the first scene can be played back when playing the second scene is finished (e.g., when the playing control reaches the second end location). More detailed illustrative explanation of the connection mechanisms among durational data (e.g., durational cue points) identifying corresponding scenes is given below using FIG. 9A. Although FIG. 4A illustratively shows using one linking engine 450, there may be a number of linking engines in some example embodiments (e.g., a user can link scenes among multiple multimedia files).

In some example embodiments, the computer system 400 further comprises a receiving engine 470. In such a scenario, the receiving engine 470 receives a request 472 for a third multimedia file from one or more users' device (not shown in FIG. 4A). The third multimedia file includes the first scene and the second scene, and the first scene and the second scene are linked to each other by the durational data (e.g., the durational cue points). Since the third multimedia file is already edited, it may be transferred back 474 to the requesting user's device (not shown in FIG. 4A). If a requested multimedia file has not been edited, the requested multimedia file may be edited according to the same process as described above before transferring the multimedia file back to the requesting user's device. In some example embodiments, the requested multimedia file may be a prerequisite or summary. If the request is a summary, some scenes from a serial/episode/show or from multiple serials/episodes/shows are selected and linked. If the request is for a prerequisite or similar scene, the scenes for the requested multimedia file may be selected and linked based on at least one of category, actor (or singer or writer), genre, degree of similarity or rank for the scenes, etc.

Figure 4B:
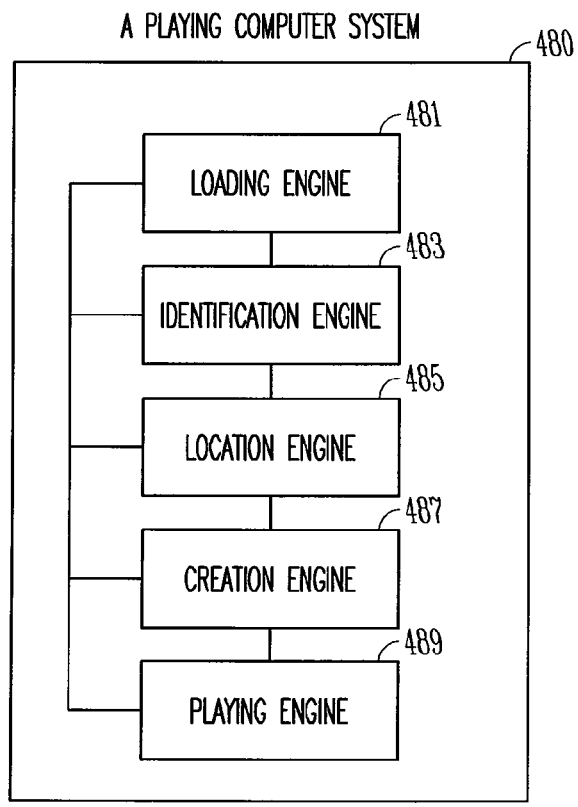
FIG. 4B is a diagram of a computer system for playing multimedia files in accordance with an example embodiment.

FIG. 4B is a diagram of a playing computer system 480 in accordance with an example embodiment. The various blocks illustrated herein may be implemented as hardware, firmware, or even as software. The computer system 480 may comprise loading engine 481, identification engine 483, location engine 485 and playing engine 489. The loading engine 481 loads a plurality of multimedia files including a first and second multimedia file, and the first multimedia file includes a first scene. The identification engine 483 identifies a trigger to play the first scene. The trigger includes category information associated with the first scene. In some example embodiments, the identification engine 483 receives the trigger to play scenes associated with the first scene from a user. The location engine 485 then locates a media file, or potentially a number of media files, including one or more durational data (e.g., durational cue point) satisfying the category information. The playing engine 489 plays the durational data (e.g., durational cue point) included in the located the multimedia file. In some example embodiments, the trigger to play the first scene is received from an input device (not shown in figures) associated with the user device (e.g., 220-1). The input device receives a user's instruction and delivers it to the memory unit 234 for further processing by the processing unit 236 for further processing. For example, the input device may be a mouse, keyboard, touch screen, etc. In some example embodiments, the playing computer system 480 may be implemented as a separate computer system from the authoring computer system 400. In some example embodiments, both the playing computer system 480 and the authoring computer system 400 may be implemented as a single computer system.

In some example embodiments, the location engine 485 assigns a rank to each durational data (e.g., durational cue point) and arranges (e.g., sorts) the durational data (e.g., the durational cue points) based upon the rank. The rank may be based upon values including at least one of a preference, a viewing history, a degree of similarity, or a number of category matches for a corresponding scene. In some example embodiments, the rank changes dynamically during playing the multimedia files. For example, even if a rank of durational data (e.g., durational cue point) identifying a scene is the highest in order based on the preference, the overall rank for the durational data (e.g., the durational cue point) may be overridden to be the lowest if the scene identified by the durational data (e.g., the durational cue point) has been viewed by the user requesting the multimedia including the scene and vice versa. The rank may also vary on the number of category matches. For example, if three categories match for durational data (e.g., durational cue point) identifying a scene, then the rank of the durational data is higher than other durational data having only one or two matching categories.

The playing computer system 480 may further have creation engine 487. The creation engine 487 creates a linked durational data file (e.g., a linked durational cue point file) using durational data (e.g., a number of durational cue points) contained in the located multimedia file. The linked durational data file may be a linked durational cue point file comprising one or more durational cue points from one or more multimedia files. The linked durational data file may be a summary of one or more multimedia files that are related to a currently loaded multimedia file. The linked durational data file may be prerequisite scenes or similar scenes from one or more multimedia files. In some example embodiments, the linked durational cue point file may have starting locations and ending locations of the located durational data (e.g., durational cue points). In some example embodiments, the linked durational data file may contain the located durational data (e.g., durational cue points) in their entirety.

Figure 5A:
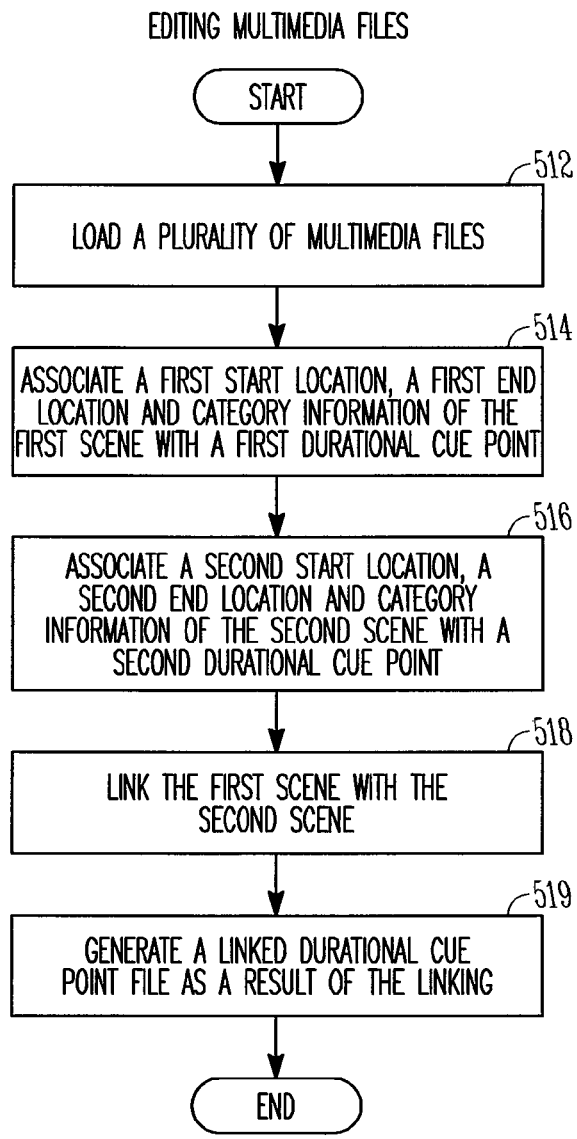
FIG. 5A is a flow chart illustrating a method used to edit multimedia files in accordance with an example embodiment.

FIG. 5A is a flow chart illustrating a method 510 used to edit multimedia files in accordance with an example embodiment. At operation 512, a plurality of multimedia files including a first and a second multimedia file are loaded to be edited. The first multimedia file includes a first scene, and the second multimedia file includes a second scene. At operation 514, a first duration data (e.g., first durational cue point) is associated with a first start location, a first end location and category information of the first scene. At operation 516, a second durational data (e.g., second durational cue point) is associated with a second start location, a second end location and category information of the second scene. At operation 518, the first scene is linked with the second scene. For example, during the linking process, the first durational data (e.g., the first durational cue point) is connected with the second durational data (e.g., the second durational cue point). In some example embodiments, the first scene is linked with the second scene based upon a result of comparison of the category information of the second scene with the category information of the first scene. More detailed illustrative explanation about storing the category information is given below using FIG. 9B. In some example embodiments, the first durational data (e.g., the first durational cue point) is connected with the second durational data (e.g., the second durational cue point) using the second end location, for example, as explained in FIG. 4A.

In some example embodiments, a request for a third multimedia file is received from one or more users (not shown in FIG. 5A). The third multimedia file includes the first scene and the second scene, and the first scene and the second scene are linked to each other using the durational data (e.g., the durational cue points). There may be a plurality of different ways for linking durational cue points. In some example embodiments, only one durational cue point may be linked to another. That is, linking may be one-one and bi-directional. For example, summary/highlights durational cue points may be used for this linking method. In some example embodiments, multiple durational cue points may be prerequisites for one durational cue point. In such a case, bi-directional linking, but from the latter durational cue point, may be used.

At operation 519, linked durational data file (e.g.,) is generated as a result of the linking. The linked durational data file may be a linked durational cue point file comprising one or more durational cue points from one or more multimedia files. In some example embodiments, the linked durational cue point file may be a summary of one or more multimedia files that are related to a currently loaded multimedia file. In some example embodiments, the linked durational cue point file may be prerequisite scenes or similar scenes from one or more multimedia files.

Figure 5B:
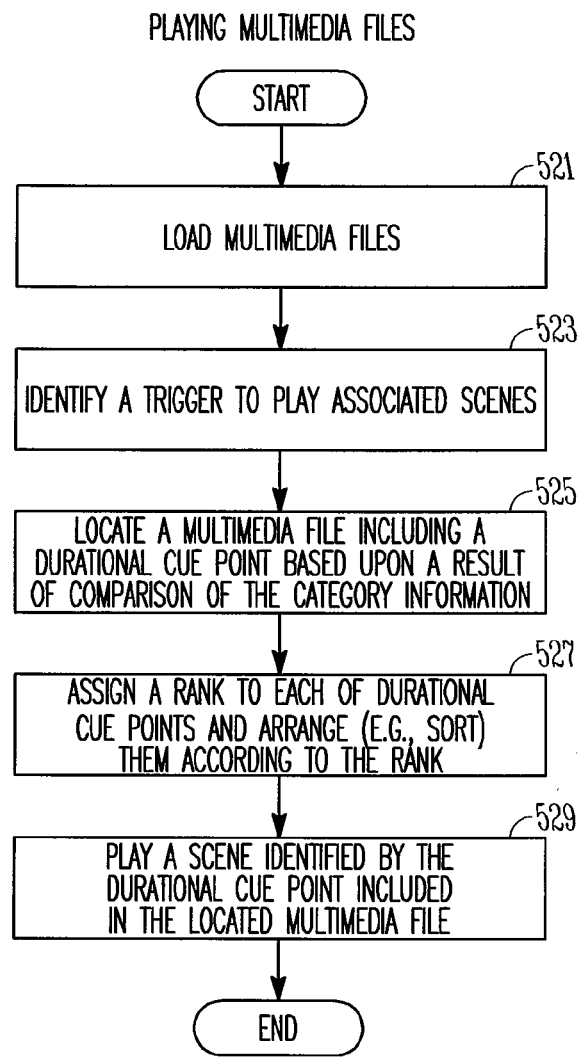
FIG. 5B is a flow chart illustrating a method used to play a multimedia file in accordance with an example embodiment.

FIG. 5B is a flow chart illustrating a method 520 used to play a multimedia file in accordance with an example embodiment. At operation 521, a plurality of multimedia files including first and second multimedia files are loaded to be played. The first multimedia file includes a first scene. At operation 523, a trigger to play scenes associated with the first scene is identified. In some example embodiments, the trigger to play scenes associated with the first scene is received from a user (not shown in FIG. 5B) via one or more input devices. For example, the user can place the request by clicking a mouse, transmitting some information, or by executing an instruction set written in a script language, such as JavaScript, ActionScript, or some other suitable scripting language. In some example embodiments, the triggering may also be through any user interface (UI) dialog or control widget. The triggering can be saved in a markup language, such as XML. The saving of script language by a user is illustrated in FIG. 10 below. The trigger includes category information associated with the first scene. In some example embodiments, the scenes associated with the first scene are prerequisite scenes for the first scene. In some example embodiments, the scenes are summary scenes for the second multimedia file. At operation 525, one or more multimedia files containing one or more durational data (e.g., durational cue points) are located based upon a result of comparison of category information of corresponding durational data. At operation 527, each of the one or more durational data is assigned rank information and arranged (e.g., sorted) by the rank information. The rank information may be based upon one or more information including preference and viewing history for the scene as explained above in FIG. 4B. At operation 529, a scene (or scenes) identified by corresponding durational data (e.g., durational cue points) contained in the located multimedia files is played.

In some example embodiments, scenes for summary may be mostly associated with the entire multimedia file or a subset of it. When a summary is generated for a video or a subset of a video, scenes may be linked, for example, in a following manner: "S1<->S2<->S3<->S4 . . . " In such a case, "Sn" means the Nth scene and "<->" means a bi-directional link. The scenes may be just temporarily stored together in memory and displayed to the user without having to forming a new file. In such a scenario, the start and end locations may be used to dynamically create the summary in memory and display it to the user. That is, durational data (e.g., durational cue points) may be dynamically joined (e.g., linked) and displayed to a viewer. In some example embodiments, for example, if a user explicitly expresses his wish to have a summary as a separate file, the summary may be created as a separate multimedia file that includes entire scenes identified by corresponding start and end locations.

Figure 6A:
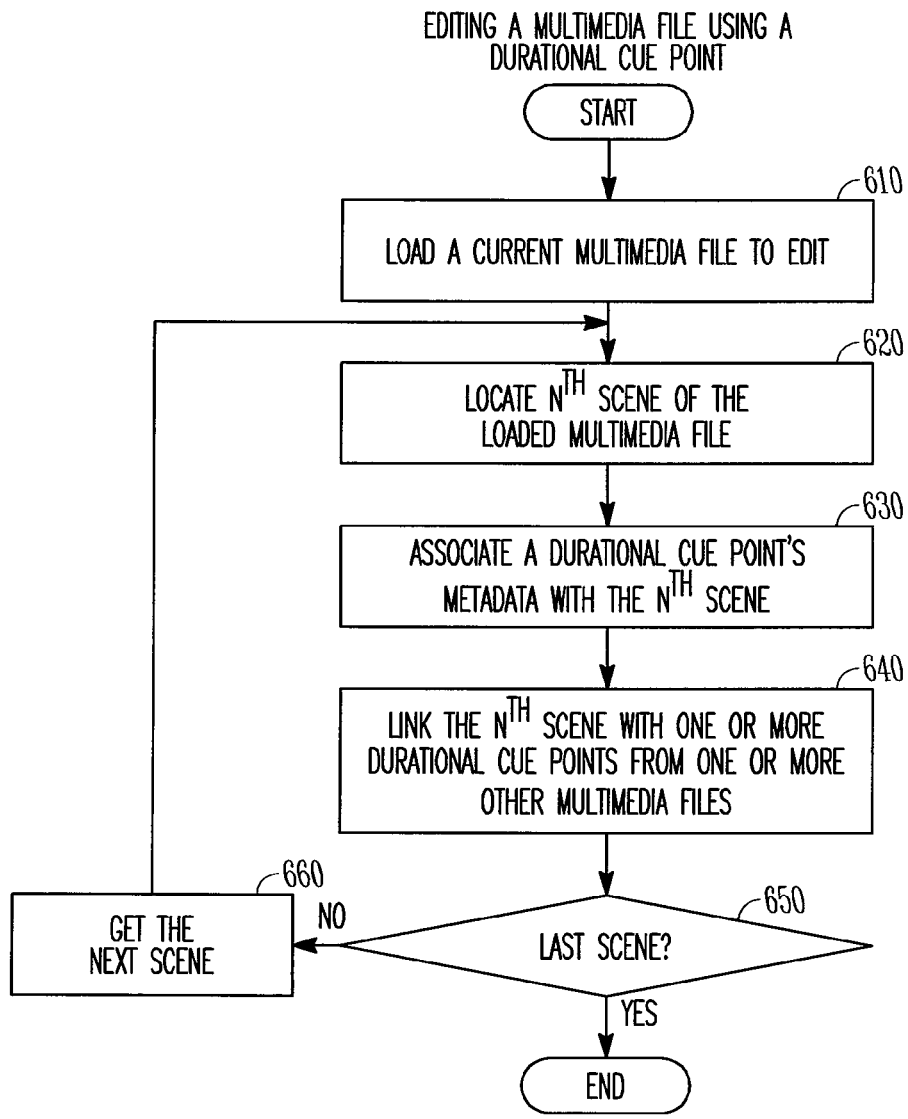
FIG. 6A is a flow chart illustrating a method used to edit a multimedia file in accordance with an example embodiment.

FIG. 6A is a flow chart illustrating a method 600 used to edit a multimedia file in accordance with an example embodiment. At operation 610, a current multimedia file to edit is loaded. At operation 620, a scene of the loaded multimedia file is located. The scene can be the Nth scene of the multimedia file (N=1, 2 . . . the last scene number). At operation 630, a durational cue point's metadata, such as type, start location, end location and category information is associated with the located scene by a user. More detailed illustrative explanation about the metadata for a duration cue point is given below using FIG. 9B. At operation 640, the Nth scene may be linked with one or more durational cue points from one or more other multimedia files. In some example embodiments, the Nth scene is linked with the one or more durational cue points based upon a result of comparison of the category information of the one or more durational cue points with the category information of the Nth scene. At operation 650, it is determined whether the Nth scene is the last scene of the loaded multimedia file. If the Nth scene is not the last scene, control moves to operation 660, where the value of the N is adjusted to get the next scene to edit. In some example embodiments, the value of N is increased by one. In some example embodiments, the value of N is increased by any number based upon a user's request. That is, the user can decide to edit the last scene of the multimedia file after editing the first scene. In some example embodiments, such a random choice of a scene to edit is accomplished by moving the scene indicator 316 of the authoring interface unit 131, (FIGS. 1 and 3), to a wanted scene directly. In some example embodiments, a specific number or letter (e.g., 0, 1, 2 . . . Last) is provided by a user to indicate a particular scene to edit. In any event, once the next scene number is determined, the control moves to operation 620 and repeats the operations as described above. If the Nth scene is the last scene, the editing process for the multimedia file is finished. More detailed illustrative explanation about linking duration cue points is given below using FIG. 9A.

It is noted that the multimedia file can be any type of digital contents, such as movies, audio books and songs or serials/episodes/shows, etc. Therefore, in some example embodiments, the linking process includes connecting a scene from one type of multimedia file to a scene or portion from another type of multimedia file. For example, there is comparatively limited time for each scene in a movie because of its running time. Because of that, some scenes in a movie do not have enough explanations. In contrary, an audio book of the original novel for a movie (e.g., Harry Potter audio book for the movie Harry Potter) may have comparatively much more detailed explanations than the movie. If that is a case, a scene from the Harry Potter movie can be linked with one or more corresponding scenes or portions from the Harry Potter audio book upon requests from a user.

Figure 6B:
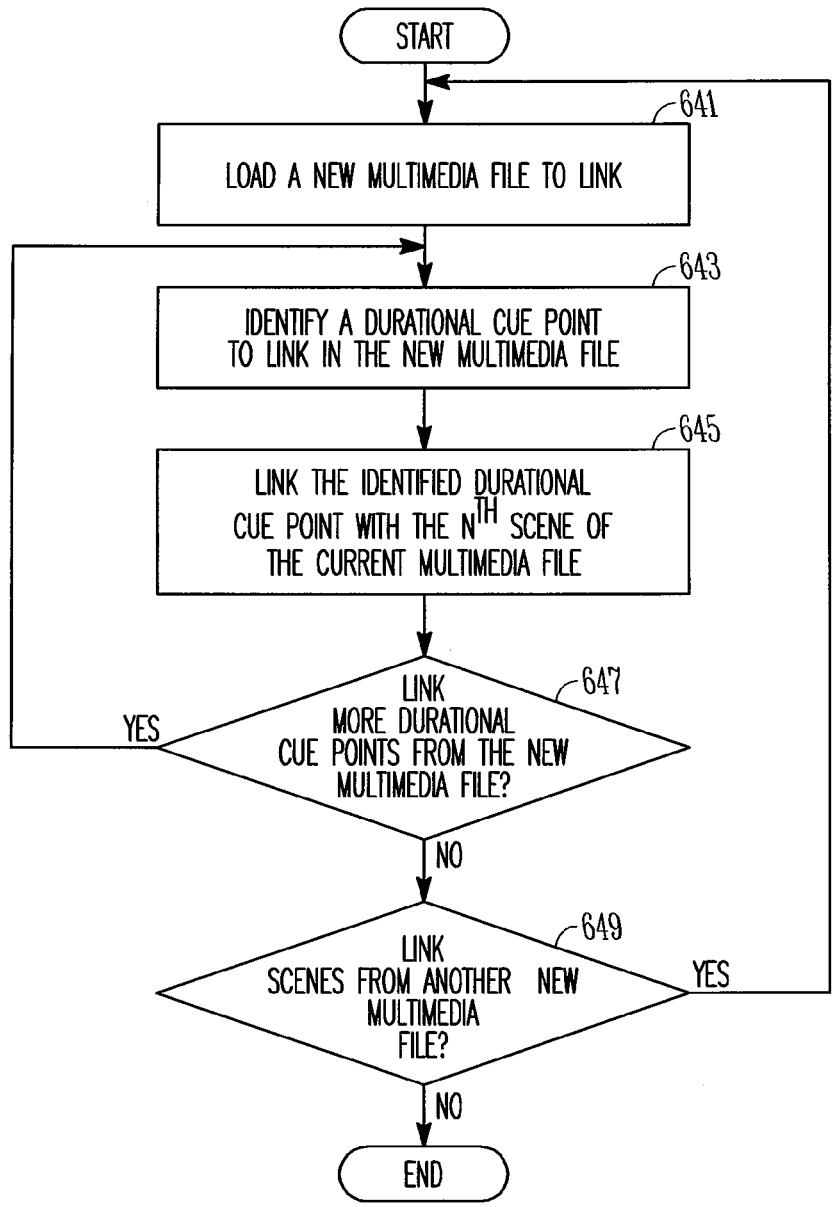
FIG. 6B is a flow chart illustrating a detailed method used to link a scene with one or more other scenes in accordance with an example embodiment.

FIG. 6B is a flow chart illustrating the linking operation 640 in more detail in accordance with an example embodiment. At operation 641, a new multimedia file to link with the Nth scene in FIG. 6A is loaded. At operation 643, a durational cue point to link is identified in the new multimedia file. As explained in FIG. 6A, the durational cue point to link is identified based on its category information matching the category information of the Nth scene. In such a scenario, a matching durational cue point can be identified based upon a result of automatic comparison of the corresponding category information. In some example embodiments, however, a matching durational cue point can be identified manually by a user by moving the scene indicator 346, (FIG. 3), through the scenes of the loaded new movie. At operation 645, the identified durational cue point is linked with the Nth scene of the current multimedia file. At operation 647, it is determined whether there is another durational cue point to link in the new multimedia file. If it is determined so, the control moves to operation 643 and repeats the operations as described above. If it is determined that there is no more durational cue point to link in the new multimedia file, the control moves to operation 649. At operation 649, it is determined whether one or more scenes from another new multimedia file need to be linked. If it is determined so, the control moves to operation 641 and repeats the operations as described above. If it is determined that there is no more new movie to link with the Nth scene, the linking process 640 is finished.

Figure 7:
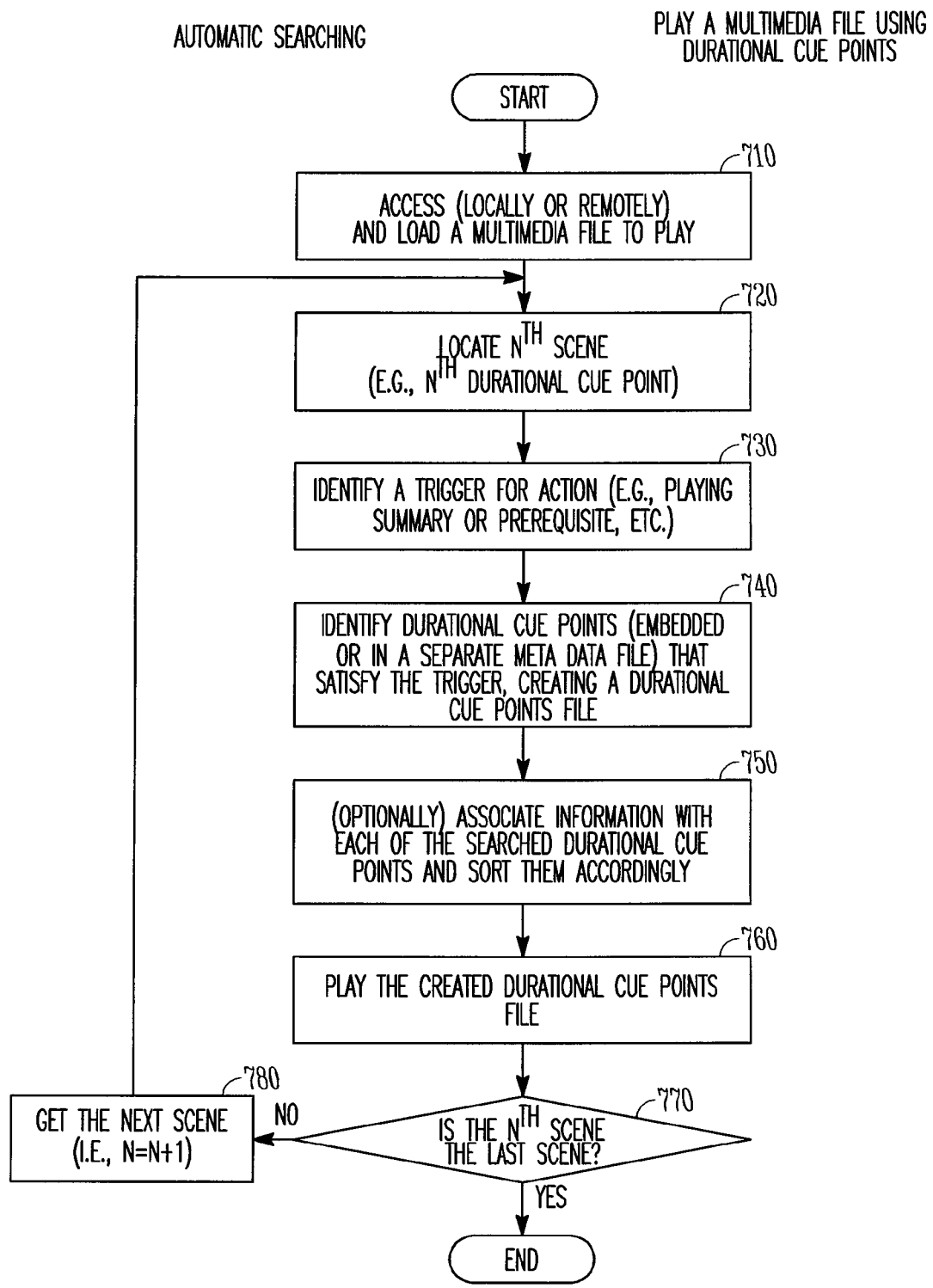
FIG. 7 is a flow chart illustrating a method used to play a multimedia file in accordance with an example embodiment.

FIG. 7 is a flow chart illustrating a method 700 used to play a multimedia file using durational cue points in accordance with an example embodiment. At operation 710, a multimedia file to play is loaded. In some example embodiments, the multimedia file is accessed and retrieved locally. In some example embodiments, the multimedia file is accessed remotely and downloaded to a local storage from a remotely located multimedia service host, such as the host server 270 in FIG. 2. At operation 720, a scene to play (e.g., the Nth durational cue point) is located. At operation 730, a trigger for an action is identified. In some example embodiments, the action may be a request to play a summary for the current movie or another movie related in context. In some example embodiments, the action may be a request to play a prerequisite for the current scene. Prerequisites are scenes determined to be related so much in context to a current scene to play that need to be presented prior playing the current scene. More detailed explanation about playing prerequisite scenes is given below in FIG. 8.

At operation 740, durational cue points that satisfy the trigger are searched to create a linked durational cue point. In some example embodiments, metadata file embedded in each durational cue point is used to locate the satisfying durational cue points. In some example embodiments, a separate external script file is used. More detailed explanation about the use of embedded metadata file and separate script file for a durational cue point is given below in FIG. 9 and FIG. 10, respectively. At operation 750, optionally, each of the located durational cue points is given rank information and arranged in order based on the rank information to generate the linked durational cue point file. Detailed explanation of an embodiment using the rank information was given above in FIGS. 4B and 5B. At operation 760, once the linked durational cue point file is created, one or more scenes identified by the durational cue points included in the linked durational cue point file are played before the current (e.g., the Nth) scene is played. At operation 770, it is determined whether the current (e.g., the Nth) scene is the last scene to play in the multimedia file loaded at operation 710. If it is not, the control moves to operation 780. At operation 780, the scene number is adjusted to get a next scene as described in FIG. 6A. Then the operations are repeated as described above. If it is determined that the current scene is the last scene to play in the multimedia file, the playing process for the multimedia file is finished.

Figure 8:
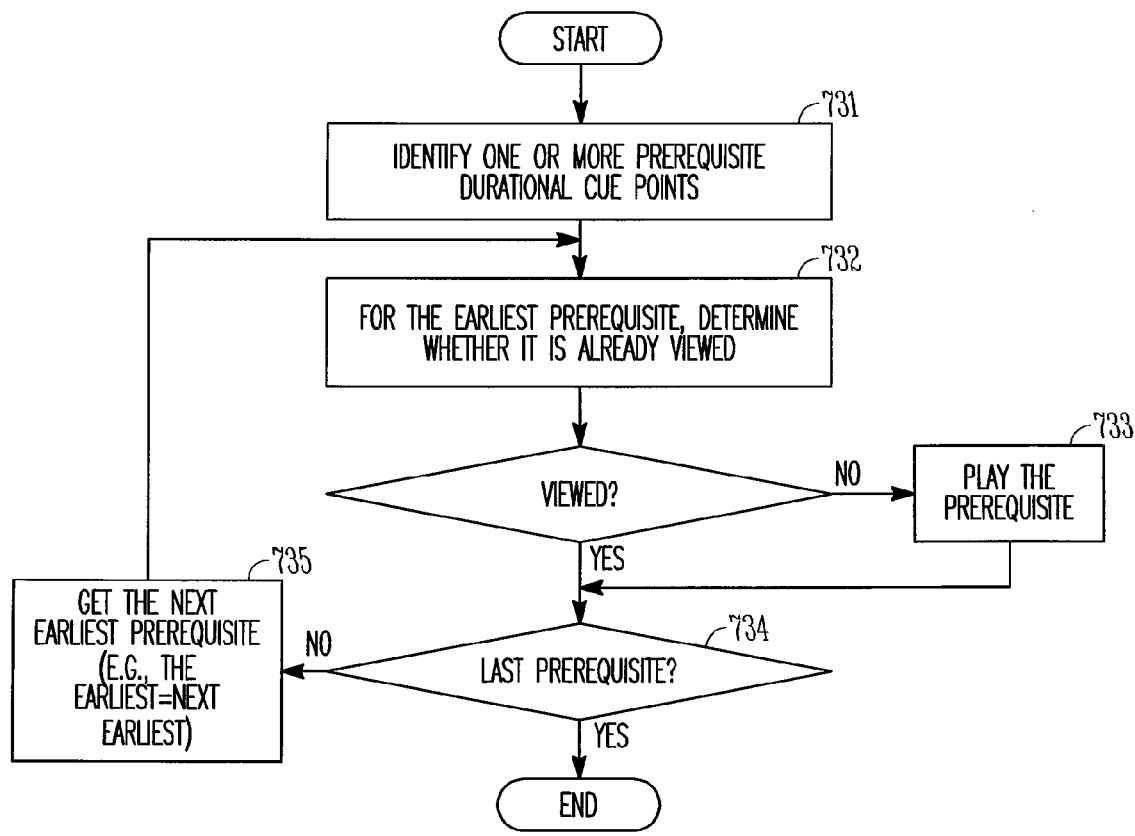
FIG. 8 is a flow chart illustrating a detailed method used to handle requests to play prerequisite scenes in accordance with an example embodiment.

FIG. 8 is a flow chart illustrating a detailed method 730 used to handle requests to play prerequisite scenes in accordance with an example embodiment. At operation 731, one or more prerequisite scenes for a given scene are identified. In some example embodiments, each prerequisite scene is associated with a corresponding durational data (e.g., durational cue point). Then, one or more durational cue points satisfying the requests are identified based on a result of comparison of metadata, such as category information, of the durational cue points as described above. At operation 732, it is determined whether the earliest prerequisite scene has been viewed by a requesting user. If it is determined that the earliest prerequisite scene has never been viewed by the user, the control moves to operation 733. At operation 733, the prerequisite scene is played and control moves to operation 734. If it is determined that the earliest prerequisite scene has been viewed by the user, the control moves to operation 734. At operation 734, it is determined whether there is another prerequisite scene to play. If it is determined so, the control moves to operation 735, where the next prerequisite scene is obtained. Then the control moves to operation 732 and the operations are repeated as describe above. If it is determined that there is no more prerequisite scene to play at operation 734, the process for handling requests to play prerequisite scenes is finished.

Figure 9A:
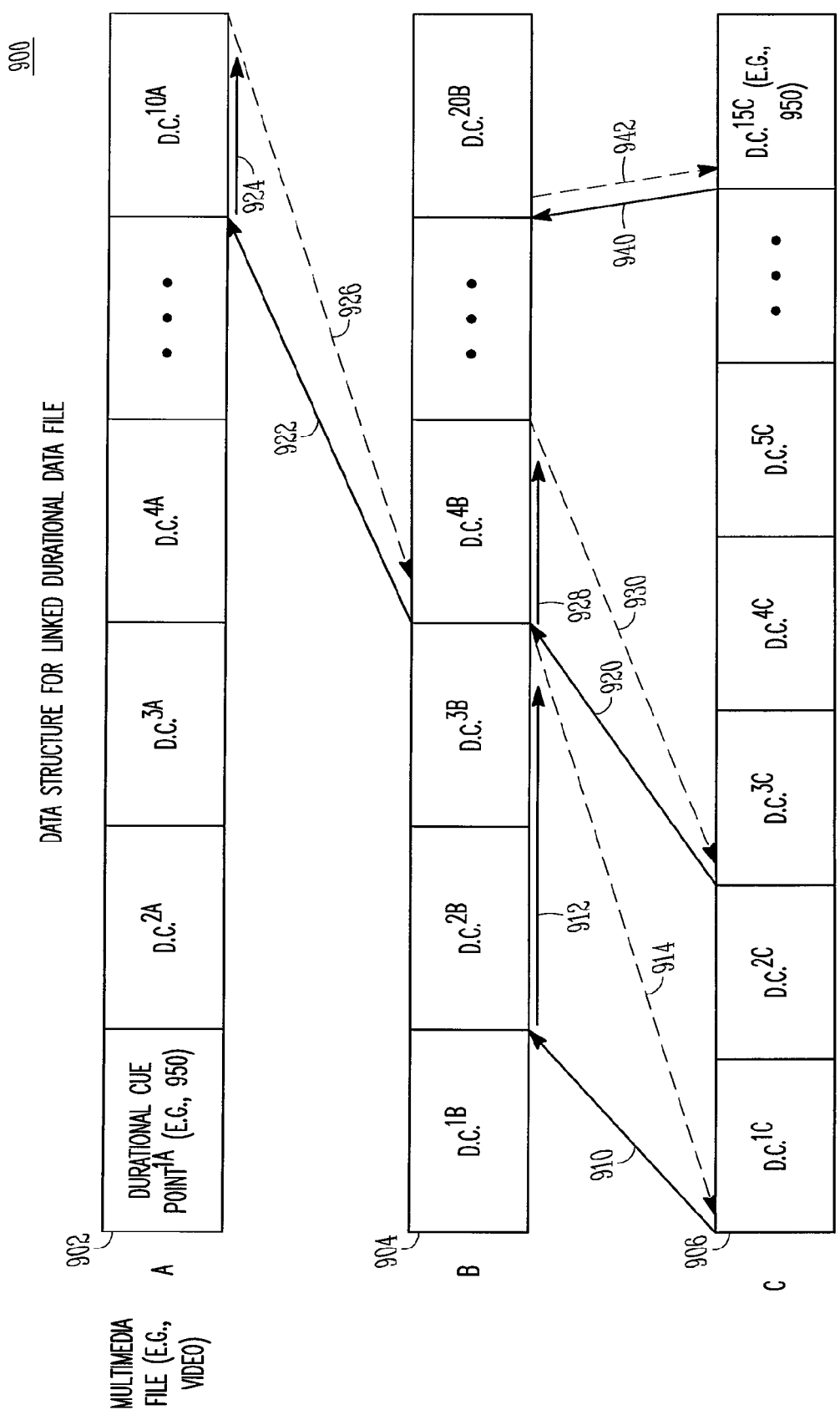
FIG. 9A is a diagram illustrating a data structure for linked durational data file in accordance with an example embodiment.

FIG. 9A is a diagram illustrating a data structure 900 for linked durational data file in accordance with an example embodiment. Illustrated are three examples of prerequisite scenes using three multimedia files A, B and C (902, 904 and 906). The multimedia file C is currently loaded and one or more scenes of the multimedia files A and B are linked with one or more related scenes of the multimedia file C. In this given example, the multimedia files A, B and C comprises ten, twenty and fifteen sections of content (e.g., scenes) identified by corresponding durational data (e.g., durational cue points), respectively. In the first example, when the playing control reaches the first durational cue point of the file C (e.g., durational cue point 1C ($DC^{1C}$)), the playing control identifies 910 the second and third durational cue points of the file B (e.g., durational cue point 2B ($DC^{2B}$) and durational cue point 3B ($DC^{3B}$)) as linked prerequisite scenes. Since there is no other linked prerequisite scene for the durational cue point 1C, the playing control plays 912 sections of content (e.g., scenes) identified by the durational cue point 2B and durational cue point 3B if these durational cue points have never been viewed by a user who is watching the multimedia file C. Once the playing of the scenes identified by the durational cue point 2B and durational cue point 3B is done, the playing control returns 914 to the starting point of the durational cue point 1C and plays a scene identified by the durational cue point 1C.

In the second example, when the playing control reaches the third durational cue point of the file C (e.g., durational cue point 3C ($DC^{3C}$)), the playing control identifies 920 the fourth durational cue point of the file B (e.g., durational cue point 4B ($DC^{4B}$)) as a linked prerequisite scene. In this example, however, the playing control further identifies 922 the tenth durational cue point of the file A (i.e., durational cue point 10A ($DC^{10A}$)) as another and the earliest linked prerequisite scene. If the durational cue point 10A has never been viewed by the user, the playing control plays 924 a scene identified by the durational cue point 10A first and returns 926 to the durational cue point 4B. The playing control then plays 928 a scene identified by the durational cue point 4B and returns 930 to the durational cue point 3C. The playing control then plays a scene identified by the durational cue point 3C. In some example embodiments, if any of the durational cue point 10A and durational cue point 4B has been viewed by the user, the particular viewed durational cue point may not be played as explained above in FIG. 8.

In the third example, when the playing control reaches the fifteenth durational cue point of the file A, the playing control identifies 940 the twentieth durational cue point of the file B (e.g., durational cue point 20B ($DC^{20B}$)) as a linked prerequisite scene for the fifteenth durational cue point of the file C (e.g., durational cue point 15C ($DC^{15C}$). In this example, however, since a scene identified by the durational cue point 20B has been viewed by the user (not shown in FIG. 9A), the playing control returns 942 to the durational cue point 15C without playing the scene identified by the durational cue point 20B. Then, the playing control plays a scene identified by the durational cue point 15C. In some example embodiments, memory pointers are used to indicate a starting location (e.g., point or time) and an ending location (e.g., point or time) of a durational cue point. In some example embodiments, a temporal reference value may be used for that purpose. More detailed illustrative data structure for the durational cue points (e.g., 902) is represented below using FIG. 9B.

In some example embodiments, prerequisite and summary durational cue points are combined. For example, instead of not playing a pre-requisite which has already been watched, a summary of the prerequisite portion is played to refresh a viewer's memory. Likewise, similar and summary durational cue points are combined. In some example embodiments, prerequisites of an entire video are automatically generated and played (e.g., automatic recap generation). In such a scenario, a union of all pre-requisite scenes from all prerequisite cue points in the video is found. Any duplicates are removed if necessary. In such a prerequisite union summary, a viewer may get all prerequisite scenes for a multimedia file. In some example embodiments, a viewer can even set the duration of prerequisite summary and the length of each prerequisite in the recap may be decided based upon the priority of that scene. In some example embodiments, a viewer can simply fast forward/rewind or seek to any of these cue points in the summary or prerequisite.

Figure 9B:
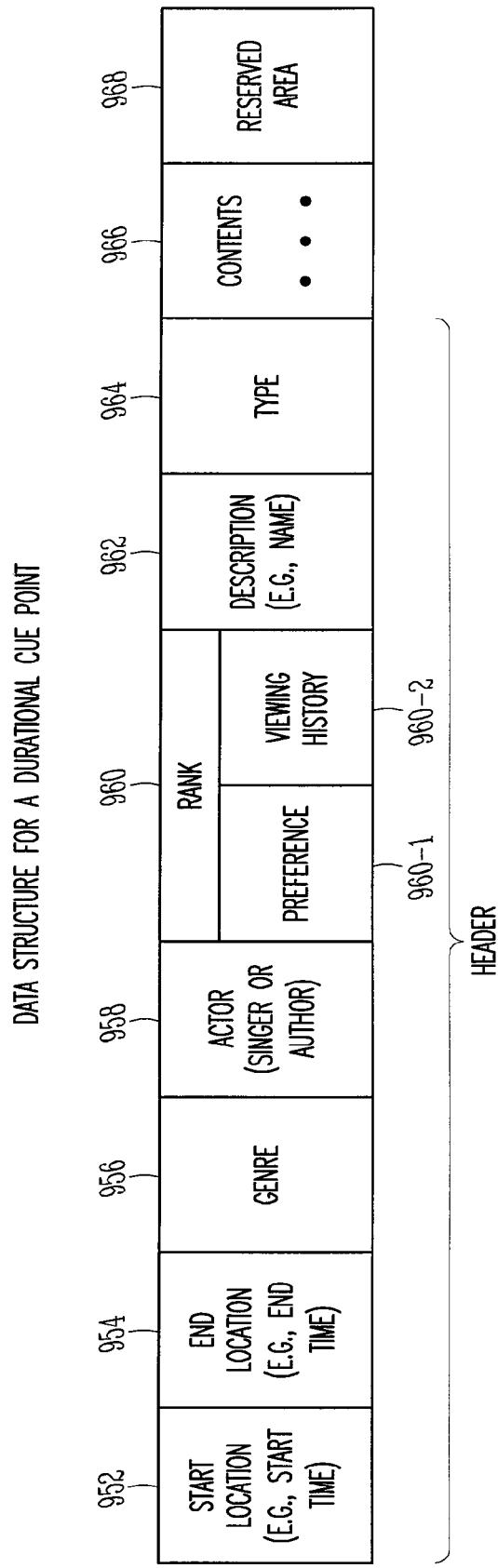
FIG. 9B is a diagram illustrating a data structure of a durational referencing cue point in accordance with an example embodiment.

FIG. 9B is a diagram illustrating a data structure 950 of a durational referencing cue point in accordance with an example embodiment. The data structure 950 comprises "start location" 952, "end location" 954, "genre" 956, "actor (Singer or Author)" 958, "rank" 960 including "preference" 960-1 and "viewing history" 960-2, "description" 962, "type" 964, "contents" 966 and reserved area 968. The start location 952 and end location 954 indicates the beginning and ending of a content segment identified by a given durational cue point. In some example embodiments, the start location 952 and end location 954 are numbers representing corresponding points in time in hours, minutes, seconds, and milliseconds (HH:MM:SS.mmm) when the durational cue points starts or ends. The genre property 956 is a string indicating the genre (e.g., comedy, action, mystery, SF, etc.) for the scene associated with the durational cue point. The actor (singer or author) property 958 is a string indicating who acts (sings, or wrote) in the content 966 of the durational cue point. In some example embodiments, more properties can be added to show different categories. For example, "director" property may be added to show a director of a movie. Also, "period" property may be added to select multimedia files produced in a specified period of time.

The rank property 960 is a number or string indicating priority of the durational cue point. In some example embodiments, when several durational cue points linked to one another are played, the rank determines the order to play the corresponding durational cue point. In some example embodiments, the rank property 960 has two sub-properties, preference 960-1 and viewing history 960-2 of the scene. The preference 960-1 is a string or number indicating the extent that a user like the scene associated with the durational cue point. The viewing history 960-2 is a number indicating whether the scene associated with the duration cue point has been viewed by the user or not.

In some example embodiments, viewers may be shown similar scenes based on similar genres and ranks. In such cases, ranks are dynamically generated, and cannot be known at the time of creation of a durational cue point. They vary based on the query. In some example embodiments, the rank may be used to determine a weighted playing. That is, if variable length summary or pre-requisite or similar scenes are queried, rank determines which scenes need to be shown. It may also be that higher ranked scenes are shown completely, and lower ranked scenes are shown as summaries of lengths proportional to their rank. In some example embodiments, no of category matches may change the ranking in real time. In contrary, when all of actors, actresses and genre match, scenes are very similar and thus the rank increases in case of similar scenes. In some example embodiments, interest level is another factor which can change rank. The more often a scene is viewed, the higher interest level is given to similar scenes. In some example embodiments, the rank could have a different meaning and definition for pre-requisite scenes. The description property 962 is a string explaining the scene associated with the durational cue point. The type property 964 is a string whose value is, for example, "navigation", "event", or "script", depending on the type of the durational cue point that is created. Any script languages, such as ActionScript and markup languages like XML, can be used to externally store the durational cue points when they are not embedded in a multimedia file (e.g., FLV file) as internal metadata. The reserved area 968 is a space preserved for late use. In some example embodiments, the reserved area 968 may be used to store information of one or more prerequisite scenes for use as described above in FIG. 9A.

FIG. 10 is an example code 1000 illustrating an XML file in accordance with an example embodiment. Illustrated in FIG. 10 are <DurationalCuePoint> tags 1010, 1020 and <LinkFiles> tag 1030. Each of the <DurationalCuePoint> tags 1010, 1020 defines durational cue point 1 and durational cue point 2, respectively. Various tags are used to associate relevant information with the durational cue point. For example, the <Start> tag 1011 represents the start location (e.g., 12 minute 00 second) of the durational cue point 1. The <End> tag 1012 represent the end location (e.g., 20 minute 00 second) of the durational cue point 1. The <Type> tag 1013 shows a type (e.g., navigation) of the durational cue point 1. The <Genre> tag 1014, <Actor> tag 1015 and <Title> tag 1016 shows a genre (e.g., fantasy), an actor or actors (e.g., Daniel Radcliffe) and the title for the scene associated with the durational cue point 1. The <Rank> tag 1017 shows a rank information (e.g., second) for the scene associated with the durational cue point 1. The <Description> tag 1018 may be used to name the durational cue point 1 and provide a detailed explanation (e.g., Fighting) for the scene associated with the durational cue point 1. The durational cue point 2 is similarly defined using tags under the <DurationalCuePoint> tag 1020.

The <LinkFiles> tag 1030 is used to link the scene (e.g., Fighting scene) associated with the durational cue point 1 with the scene (e.g., Story of Parents scene) associated with the durational cue point 2. The <Load> tag 1031 is used to load a multimedia file (e.g., Harry Porter IV). The <Locate> tag 1032 is used to identify the durational cue point 1. Similarly, the <Load> tag 1033 is used to load another multimedia file to link (e.g., Harry Porter I). The <Locate> tag 1034 is used to identify the durational cue point 2 to link. The <Connect> tag 1035 is used to link the durational cue point 1 with the durational cue point 2. Other tag operations may be used as the XML allows. In some example embodiments, other script languages, such as ActionScript and JavaScript, may be used.

Example Database

Some example embodiments may include the various databases (e.g., 160, or 280) being relational databases or in some example cases OLAP-based databases. In the case of relational databases, various tables of data are created and data is inserted into, and/or selected from, these tables using SQL or some other database-query language known in the art. In the case of OLAP databases, one or more multi-dimensional cubes or hypercubes containing multidimensional data from which data is selected or into which data is inserted using MDX may be implemented. In the case of a database using tables and SQL, a database application such as, for example, MYSQL™, SQLSERVER™, Oracle 81™, 10 G™, or some other suitable database application may be used to manage the data. Here, the case of a database using cubes and MDX, a database using Multidimensional On Line Analytic Processing (MOLAP), Relational On Line Analytic Processing (ROLAP), Hybrid On Line Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Figure 11:
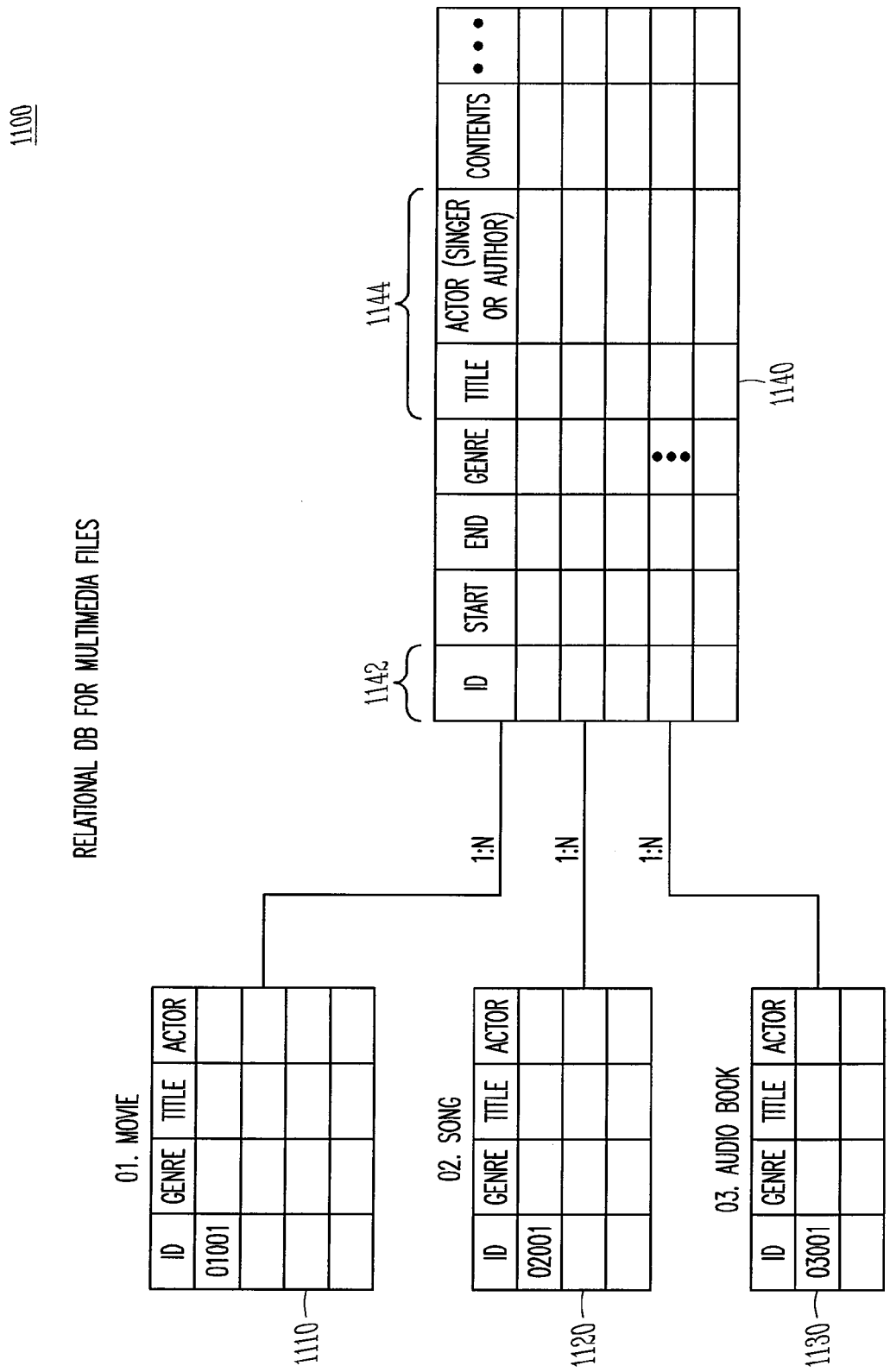
FIG. 11 is a Relational Database Scheme (RDS) illustrating various data tables that may be implemented on suitable data storages, in accordance with an example embodiment.

FIG. 11 is an RDS 1100 for multimedia files illustrating various data tables that may be implemented on suitable data storages, in accordance with an example embodiment. Illustrated in FIG. 11 are movie table 1110, song table 1120 and audio book table 1130. In some example embodiments, there can be serial/episodes/shows table (not shown in FIG. 11). Each of these tables is related to durational cue point table 1140 in 1:N relationship. That is, a row from each of the three tables (1110, 1120, and 1130) may be associated with one or more rows from the durational cue point table 1140. Three properties shown for each table in FIG. 11 are "Genre", "Title" and "Actor" ("Singer" for the Song table 02 and "Author" for the Audio book table 03). These properties are the same as "Genre", "Title" and "Actor (Singer or Author)" attribute in the durational cue point table 1140, respectively. Detailed explanation of these properties is given above using FIG. 9B.

In some example embodiments, the ID property 1142 is used as a key attribute to identify the relationship. In such a scenario, each type of multimedia may be assigned a unique numeric code. Referring to FIG. 11, movies, songs and audio books are assigned 01, 02 and 03, respectively, in front of sequence numbers. Each sequence number in a given table represents a unique multimedia file of a corresponding type. For example, movies of Superman I, II and III may be represented in the Movie table 1110 as '01001', '01002' and '01003', respectively. When another movie, Harry Potter IV, is added in the table 1110, the next available ID, '01004' is assigned to the Harry Potter movie. If Harry Potter I, II, III and IV are available as audio books as well, these audio books may be represented in the audio book table 1130 as '03001', '03002', '03003' and '03004', respectively. It is noted that Harry Potter IV is available as both a movie and an audio book. Although the sequence number for both the movie and the audio book for Harry Potter are the same as each other, these two multimedia files can be uniquely identified because of the unique numeric code assigned based on a type of multimedia files.

In some example embodiments, the combination of Title and Actor (Singer or Author) attributes 1144 is used as a key attribute. In the same example above, the Title in the movie table 1110 and the title in the audio book table 1130 are the same for Harry Potter IV. The actor property for the movie of Harry Potter IV is, for example, "Daniel Radcliffe." The author property for the audio book is, however, "J. K. Rowling." By using this combination of "Title" and "Actor (Singer or Author)" property, a multimedia file from one of the three tables (1110, 1120, 1130) can be related to one or more tuples in the durational cue point table 1140 and each of this relationship can be uniquely identified. For example, a binary large object (BLOB) data type that can hold a variable amount of data may be used for each tuple of these tables.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free from application processing. Further, a second tier may be a logic tier that performs application processing in the form of logical/mathematical manipulations of data inputted through the interface level, and that communicates the results of these logical/mathematical manipulations to the interface tier and/or to a backend or storage tier. These logical/mathematical manipulations may relate to certain business rules or processes that govern the software application as a whole. A third storage tier may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer-to-peer, or some other suitable configuration. Further, these three tiers may be distributed between more than one computer system as various software components.

Component Design

Some example embodiments may include the above illustrated tiers and the processes or operations that make them up, as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls used to implement one or more of the above-illustrated components across a distributed programming environment as distributed computing components. For example, an interface component (e.g., an interface tier) may reside on a first computer system remotely located from a second computer system containing a logic component (e.g., a logic tier). These first and second computer systems may be configured in a server-client, peer-to-peer, or some other suitable configuration. These various components may be written using the above-illustrated object-oriented programming techniques, and can be written in the same programming language or a different programming language. Various protocols may be implemented to enable these various components to communicate regardless of the programming language used to write these components. For example, a component written in Cow may be able to communicate with another component written in the Java programming language using a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Tranmission Between a Server and Client

Some example embodiments may use the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as the Internet, a Local Area Network (LAN), a Wide Area Network (WAN), or some other suitable network. In some example cases, "Internet" refers to a network of networks. These networks may use a variety of protocols for the exchange of data, including the aforementioned TCP/IP, or some other suitable protocol. These networks may be organized within a variety of topologies (e.g., a star topology) or structures.

A Computer System

Figure 12:
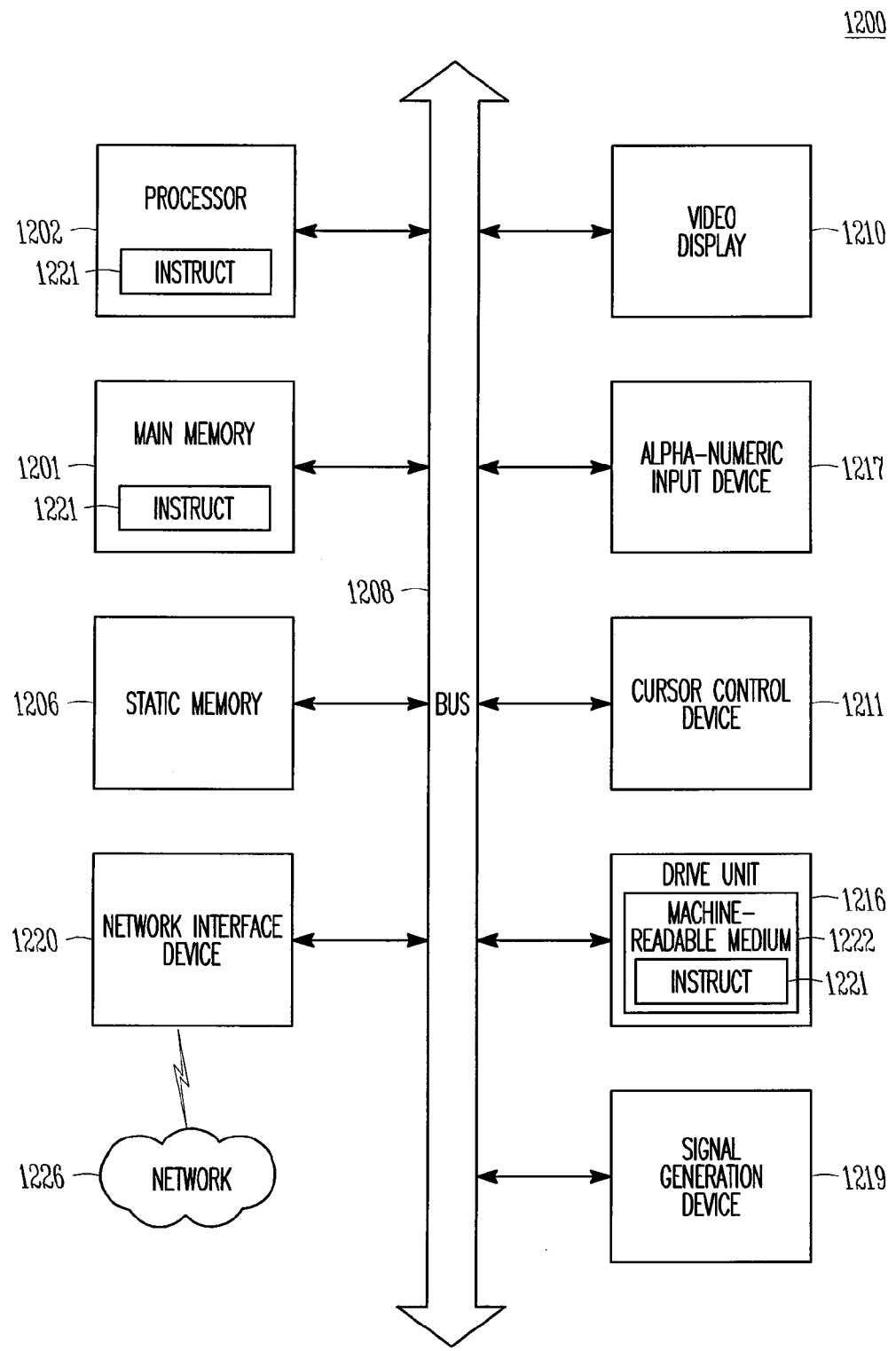
FIG. 12 is a diagram showing an example computer system that executes a set of instructions to perform any one or more of the methodologies discussed herein.

FIG. 12 is a diagram showing a computer system 1200 that executes a set of instructions to perform any one or more of the methodologies discussed herein. In some example embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The computer system 1200 includes a processor 1202 (e.g., a Central Processing Unit (CPU), a Graphics Processing Unit (GPU) or both), a main memory 1201, and a static memory 1206, which communicate with each other via a bus 1208. The computer system 1200 may further include a video display 1210 (e.g., a Liquid Crystal Display (LCD) or a Cathode Ray Tube (CRT)). The computer system 1200 also includes an alpha-numeric input device 1217 (e.g., a keyboard), a User Interface (UI) cursor controller device 1211 (e.g., a mouse), a drive unit 1216, a signal generation device 1219 (e.g., a speaker) and a network interface device (e.g., a transmitter) 1220.

The drive unit 1216 includes a machine-readable medium 1222 on which is stored one or more sets of instructions and data structures (e.g., software) embodying or used by any one or more of the methodologies or functions illustrated herein. The software may also reside, completely or at least partially, within the main memory 1201 and/or within the processor 1202 during execution thereof by the computer system 1200, the main memory 1201 and the processor 1202 also constituting machine-readable medium 1222.

The instructions 1221 may further be transmitted or received over a network 1226 via the network interface device 1220 using any one of a number of well-known transfer protocols (e.g., a Hyper Text Transfer Protocol (HTTP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

Some example embodiments may include a system for providing multimedia data via a network to one or more users. The system includes one or more end user devices operatively coupled to the network and a host server connected to the one or more end user devices via the network. The host server includes a service interface unit, memory unit and processing unit. These elements are operatively coupled to one another. The processing unit is configured to receive via the service interface unit a user request for a multimedia file from the one or more end user devices. The request includes category information for one or more scenes of the multimedia file. The processing unit is further configured to identify, for each scene, one or more durational cue points satisfying the category information corresponding to the scene. The processing unit is further configured to create a linked durational cue point file. The identified one or more durational cue points for each scene are linked to the corresponding scene during the creation process. The processing unit is further configured to distribute the multimedia file to the one or more end user devices including the created linked durational cue point file.

An Abstract of the Disclosure is provided to comply with 37 C.F.R. §1.72(b), requiring an abstract that allows the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed example embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method, comprising:
    loading a plurality of multimedia files including a first and a second multimedia file, the first multimedia file comprising a first plurality of scenes including a first scene associated with a first durational cue point that includes first metadata identifying the first scene as a summary scene and specifying first durational data, and the second multimedia file comprising a second plurality of scenes including a second scene associated with a second durational cue point that includes second metadata identifying the second scene as a summary scene and specifying second durational data;
    receiving a request to play a summary of the plurality of multimedia files;
    searching the multimedia files to identify scenes associated with durational cue points having metadata identifying the scenes as summary scenes, the searching identifying at least the first scene and the second scene based on the first metadata identifying the first scene as a summary scene and the second metadata identifying the second scene as a summary scene;
    linking the first scene with the second scene, the linking including connecting the first durational data from the first metadata, identifying a first start location and a first end location for the first scene, with the second durational data from the second metadata, identifying a second start location and a second end location for the second scene; and
    generating a linked durational data file as a result of the linking, the linked durational data file providing the summary of the multimedia files and including the first scene and the second scene from the first and second multimedia files.

2. The method of claim 1, wherein the linking the first scene with the second scene includes:
    associating first category information of the first scene with the first durational data; and
    associating second category information of the second scene with the second durational data.

3. The method of claim 1, wherein the linking of the first scene with the second scene is based upon category information of the second scene matching category information of the first scene.

4. The method of claim 1, wherein linking the first scene with the second scene includes bi-directional linking.

5. The method of claim 1, wherein the first multimedia file is the same as the second multimedia file.

6. A computer implemented method, comprising:
    loading a plurality of multimedia files including a first and a second multimedia file, the first multimedia file comprising a first plurality of scenes including a first scene associated with a first durational cue point that includes first metadata specifying first category information describing the first scene and first durational data specifying a start location and end location for the first scene, the second multimedia file comprising a second plurality of scenes including a second scene associated with a second durational cue point that includes second metadata specifying second category information describing the second scene and second durational data specifying a start location and end location for the second scene;
    identifying a trigger to play one or more prerequisite scenes or one or more summary scenes associated with the first scene, the trigger including the first category information describing the first scene;
    locating the second scene based upon comparison of the first category information describing the first scene and the second category information describing the second scene;
    playing the second scene using the second durational data.

7. The method of claim 6, wherein the identifying of the trigger to play the one or more prerequisite scenes or one or more summary scenes associated with the first scene includes receiving the trigger from an input device.

8. The method of claim 6, wherein the locating of the second scene further comprises:
    assigning a rank to each of a plurality of durational data; and
    arranging the plurality of durational data using the rank.

9. The method of claim 8, wherein the rank is based upon values including at least one of a preference, a viewing history, a degree of similarity, or a number of category matches for a corresponding scene.

10. The method of claim 8, wherein the rank changes dynamically.

11. The method of claim 8, wherein the playing of the second scene includes varying a length of the second scene to be played based upon a rank of the second durational data.

12. The method of claim 8, further comprising determining whether to play the second scene based upon a rank of the second durational data.

13. A computer system, comprising:
at least one processor, at least one memory device, and at least one network interface device:
a loading engine, stored in the at least one memory device and executable on the at least one processor, to load a plurality of multimedia files including a first and a second multimedia file, the first multimedia file comprising a first plurality of scenes including a first scene associated with a first durational cue point that includes first metadata identifying the first scene as a summary scene and specifying first durational data, and the second multimedia file comprising a second plurality of scenes including a second scene associated with a second durational cue point that includes second metadata identifying the second scene as a summary scene and specifying second durational data;
a search engine stored in the at least one memory device and executable on the at least one processor to:
receive, via the at least one network interface device, a request to play a summary of the plurality of multimedia files;
search the multimedia files to identify scenes associated with durational cue points having metadata identifying the scenes as summary scenes,
the searching identifying at least the first scene and the second scene based on the first metadata identifying the first scene as a summary scene and the second metadata identifying the second scene as a summary scene;
a linking engine, stored in the at least one memory device and executable on the at least one processor, to link the first scene with the second scene, the linking including connecting the first durational data from the first metadata, identifying a first start location and a first end location for the first scene, with the second durational data from the second metadata, identifying a second start location and a second end location for the second scene; and
a generating engine, stored in the at least one memory device and executable on the at least one processor, to generate a linked durational data file as a result of the linking, the linked durational data file providing the summary of of the multimedia files and including the first scene and the second scene from the first and second multimedia files.

14. The computer system of claim 13, wherein the linking engine associates first category information of the first scene with the first durational data and associates second category information of the second scene with the second durational data.

15. The computer system of claim 13, wherein the linking engine links the first scene with the second scene based upon category information of the second scene matching category information of the first scene.

16. The computer system of claim 13, wherein the linking engine links the first scene with the second scene bi-directionally.

17. The computer system of claim 13, wherein the first multimedia file is the same as the second multimedia file.

18. A computer system, comprising:
at least one processor and at least one memory device;
a loading engine, stored in the at least one memory device and executable on the at least one processor, to load a plurality of multimedia files including a first and a second multimedia file, the first multimedia file comprising a first plurality of scenes including a first scene associated with a first durational cue point that includes first metadata specifying first category information describing the first scene and first durational data specifying a start location and end location for the first scene, the second multimedia file comprising a second plurality of scenes including a second scene associated with a second durational cue point that includes second metadata specifying second category information describing the second scene and second durational data specifying a start location and end location for the second scene;
an identification engine, stored in the at least one memory device and executable on the at least one processor, to identify a trigger to play one or more prerequisite scenes or one or more summary scenes associated with the first scene, the trigger including the first category information describing the first scene;
a location engine, stored in the at least one memory device and executable on the at least one processor, to locate the second scene based upon comparison of the first category information describing the first scene and the second category information describing the second scene;
a playing engine, stored in the at least one memory device and executable on the at least one processor, to play the second scene using the second durational data.

19. The computer system of claim 18, wherein the identification engine receives the trigger to play the one or more prerequisite scenes or one or more summary scenes associated with the first scene from an input device.

20. The computer system of claim 18, wherein the location engine assigns a rank to each of a plurality of durational data and arranges the plurality of durational data using the rank.

21. The computer system of claim 20, wherein the rank is based upon values including at least one of a preference, a viewing history, a degree of similarity, or a number of category matches for a corresponding scene.

22. The computer system of claim 20, wherein the rank changes dynamically.

23. The computer system of claim 20, wherein the playing engine varies a length of the second scene to be played based upon a rank of the second durational data.

24. The computer system of claim 20, wherein the playing engine determines whether to play the second scene based upon a rank of the second durational data.

25. An apparatus comprising:
means for loading a plurality of multimedia files including a first and a second multimedia file, the first multimedia file comprising a first plurality of scenes including a first scene associated with a first durational cue point that includes first metadata identifying the first scene as a summary scene and specifying first durational data, and the second multimedia file comprising a second plurality of scenes including a second scene associated with a second durational cue point that includes second metadata identifying the second scene as a summary scene and specifying second durational data;
means for receiving a request to play a summary of the plurality of multimedia files;
means for searching the multimedia files to identify scenes associated with durational cue points having metadata identifying the scenes as summary scenes, the searching identifying at least the first scene and the second scene based on the first metadata identifying the first scene as a summary scene and the second metadata identifying the second scene as a summary scene;
means for linking the first scene with the second scene, the linking including connecting the first durational data from the first metadata, identifying a first start location and a first end location for the first scene, with the second durational data from the second metadata, identifying a second start location and a second end location for the second scene; and means for generating a linked durational data file as a result of the linking, the linked durational data file providing the summary of the multimedia files and including the first scene and the second scene from the first and second multimedia files.

26. The apparatus of claim 25, wherein the first multimedia file is the same as the second multimedia file.

27. A non-transitory computer-readable medium having instruction stored thereon that, when executed by a computer, cause the computer to:

load a plurality of multimedia files including a first and a second multimedia file, the first multimedia file comprising a first plurality of scenes including a first scene associated with a first durational cue point that includes first metadata identifying the first scene as a summary scene and specifying first durational data, and the second multimedia file comprising a second plurality of scenes including a second scene associated with a second durational cue point that includes second metadata identifying the second scene as a summary scene and specifying second durational data;

receive a request to play a summary of the plurality of multimedia files;

search the multimedia files to identify scenes associated with durational cue points having metadata identifying the scenes as summary scenes, the searching identifying at least the first scene and the second scene based on the first metadata identifying the first scene as a summary scene and the second metadata identifying the second scene as a summary scene;

link the first scene with the second scene, the linking including connecting the first durational data from the first metadata, identifying a first start location and a first end location for the first scene, with the second durational data from the second metadata, identifying a second start location and a second end location for the second scene; and generate a linked durational data file as a result of the linking, the linked durational data file providing the summary of the multimedia files and including the first scene and the second scene from the first and second multimedia files.

28. The non-transitory computer-readable medium of claim 27, wherein the first multimedia file is the same as the second multimedia file.

\* \* \* \* \*